United States Patent [19]

Bossler et al.

[11] Patent Number: 5,108,624

[45] Date of Patent: Apr. 28, 1992

[54] METHOD FOR DEOXYGENATING A LIQUID

[75] Inventors: John F. Bossler, Washington Crossing, Pa.; Herman C. Hamann, Forked River; Walter I. Kinstler, Fairlawn, both of N.J.

[73] Assignee: Arrowhead Industrial Water, Inc., Lincolnshire, Ill.

[21] Appl. No.: 491,979

[22] Filed: Mar. 12, 1990

[51] Int. Cl.$^5$ .............................................. C02F 1/20
[52] U.S. Cl. .................................. 210/750; 210/668; 210/757; 422/16
[58] Field of Search ............... 210/750, 757, 664, 902, 210/698, 668; 210/698, 668; 422/13, 16, 17

[56] References Cited

U.S. PATENT DOCUMENTS

| | | | |
|---|---|---|---|
| 3,962,113 | 6/1976 | Schiessl et al. | 252/188 |
| 4,067,690 | 1/1978 | Cuisia et al. | 252/392 |
| 4,269,717 | 5/1981 | Slovinsky | 210/750 |
| 4,289,645 | 9/1981 | Muccitelli | 252/178 |
| 4,350,606 | 9/1982 | Cuisia et al. | 252/364 |
| 4,363,734 | 12/1982 | Slovinsky | 210/750 |
| 4,399,098 | 8/1983 | Cuisia | 422/13 |
| 4,556,492 | 12/1985 | Dickerson et al. | 210/668 |
| 4,626,411 | 12/1986 | Nemes et al. | 422/13 |
| 4,627,921 | 12/1986 | Meyers et al. | 210/668 |
| 4,681,737 | 7/1987 | Walker et al. | 422/16 |
| 4,818,411 | 4/1989 | Dickerson et al. | 210/668 |
| 4,851,130 | 7/1989 | May | 210/750 |
| 4,895,703 | 1/1990 | Zupanovich et al. | 422/14 |

OTHER PUBLICATIONS

Article by F. R. Houghton entitled The Use of Active Carbon With Hydrazine in the Treatment of Boiler Feed Water—pp. 54–58.

*Primary Examiner*—Peter Hruskoci
*Attorney, Agent, or Firm*—George H. Gerstman; George W. Moxon, II; Garrettson Ellis

[57] ABSTRACT

A method is provide for deoxygenating water that is at substantially ambient temperature and contains dissolved oxygen. A selected reducing agent is injected into a stream of the water, and the water that contains the organic reducing agent is then passed over a packed catalyst bed. This causes the reducing agent, with the catalyst at the ambient temperature, to reduce the oxygen in the liquid.

8 Claims, No Drawings

METHOD FOR DEOXYGENATING A LIQUID

FIELD OF THE INVENTION

The present invention concerns a novel method for deoxygenating a liquid.

BACKGROUND OF THE INVENTION

Current methods of removing oxygen from liquids such as water include mechanical deaeration, heating the liquid, or chemical reduction.

Mechanical deaeration requires a substantial capital investment and entails considerable operating and maintenance costs.

Heating the water can also entail a considerable capital investment. Further, a significant amount of energy is required to heat the water and such energy may be unavailable during cold startup of boilers.

Chemical deoxygenation is generally ineffective at ambient temperatures. However, in a deoxygenation process described in Houghton, et al., "The Use Of Activated Carbon With Hydrazine In The Treatment Of Boiler Feedwater", *International Water Conference*, (1957), pgs. 54-58, boiler feedwater that is at substantially ambient temperature and contains dissolved oxygen is deoxygenated by injecting the water with greater than the stoichiometric amount of hydrazine required to react with the dissolved oxygen and then the hydrazine-containing water is passed through a bed of activated carbon. This process, generally referred to as the "Houghton process", is described in U.S. Pat. No. 4,556,492. However, the Houghton process requires the use of hydrazine, a material that poses significant health and safety problems.

In another prior art chemical reduction process, hydrogen gas and a platinum catalyst is utilized. The hydrogen gas/platinum process is effective at ambient temperatures, but it requires the use of hydrogen which is an explosive gas. The platinum catalyst is also extremely expensive.

It is an object of the present invention to provide a deoxygenation method that can reduce the oxygen in a liquid that is at substantially ambient temperature.

Another object of the present invention is to provide a deoxygenation method that does not require a substantial capital investment.

A further object of the present invention is to provide a deoxygenation method that does not entail considerable operating and maintenance costs.

A further object of the present invention is to provide a deoxygenation method that does not require mechanical deaeration.

A still further object of the present invention is to provide a deoxygenation method that does not require the water to be heated for reduction of oxygen.

Another object of the present invention is to provide a deoxygenation method that does not require the use of hydrazine.

A further object of the present invention is to provide a deoxygenation method that does not require the use of hydrogen.

Another object of the present invention is to provide a deoxygenation method that does not require the use of an expensive catalyst such as platinum.

Other objects and advantages of the present invention will become apparent as the description proceeds.

SUMMARY OF THE INVENTION

In accordance with the present invention, a method is provided for deoxygenating a liquid that is at substantially ambient temperature and contains dissolved oxygen. The method of the present invention comprises the steps of injecting into a stream of the liquid a reducing agent, and contacting the liquid containing the organic reducing agent with a solid-phase catalyst to cause the organic reducing agent and the catalyst at the ambient temperature to reduce the oxygen in the liquid.

In the illustrative embodiment, the organic reducing agent is selected from the group consisting of carbohydrazide, semicarbazide, salts of carbohydrazide or semicarbazide such as the hydrochloride salts, diethylhydroxylamine, hydroxylamine and salts such as hydroxylamine hydrochloride, 1,1-dimethylhydrazine, 1,2-dimethylhydrazine, methylhydrazine, hydroquinone, sulfoxylate salts such as sodium sulfoxylate, ascorbic acid, isoascorbic acid, Vitamin E (tocopherol), and reducing sugars such as glucose. Sulfoxylates are addition products of sulfite to organic aldehydes, providing improved charcoal adsorption.

In the illustrative embodiment, the catalyst is selected from the group consisting of activated carbon, synthetic carbonaceous adsorbents, cation exchange resins and molecular sieves, and zeolites and polymeric adsorbents, for example: XAD-4, XAD-16, and XEN-563 sold by the Rohm & Haas Company.

Preferably, a molar excess of reducing agent is provided, sufficient to reduce all free oxygen present.

DETAILED DESCRIPTION OF THE ILLUSTRATIVE EMBODIMENT

A stream of water containing dissolved oxygen is injected with an organic reducing agent, preferably carbohydrazide or diethylhydroxylamine. It has been found that if the water is at ambient temperature the oxygen reduction is negligible and, thus, it is known in the art to use such organic reducing agents only at elevated temperatures. Typically, such organic reducing agents used in the prior art are injected directly into boiler water which is generally over 210° F. These organic reducing agents, used at such high temperatures, act to reduce the oxygen in the very hot water. We have found, however, that various reducing agents can be used successfully at ambient temperature water by contacting the water which contains both the oxygen and the reducing agent with a solid phase catalyst. To this end, the water containing both the oxygen and the reducing agent is passed over a packed catalyst bed, such as a bed of granular activated carbon. The catalyst causes the reducing agent to react with the oxygen, converting the oxygen to innocuous products. Thereafter, if desired, the deoxygenated water may be passed through a mixed bed for polishing, and the deoxygenated, polished water is fed to a point of use such as a boiler of power generating equipment.

EXAMPLES

Example 1

In accordance with the method of the present invention a stream of water saturated with dissolved oxygen at 60° F. and flowing at a rate of 2 gallons per minute was deoxygenated. A feed of 1 gpd (gallon per day) of about 10 percent (wt./vol.) carbohydrazide solution ("Eliminox" by Nalco Chemical Co.) was injected into the water, and the water containing the carbohydrazide was passed through a packed bed of activated carbon having a total volume of two cubic feet. Reduction in the oxygen to levels of less than 10 ppb (parts per billion) of oxygen were achieved on a single passage. The deoxygenated water may be deionized by passing it through a conventional mixed bed ion exchange resin system.

Example 2

A. In another example, the same method described above was utilized, but diethylhydroxylamine was used as the reducing agent in place of the carbohydrazide. Similar results were achieved as with the carbohydrazide/activated carbon example above.

B. It has been found effective to run the process at a rate of gallon per minute of water saturated with oxygen at ambient temperature per cubic foot of activated carbon, with a feed to provide to the water 20 ppm (parts per million) of one of the above reducing agents.

Example 3

1) To a 3.6 cu. ft. exchange tank was added 2.0 cu. ft. of fresh activated carbon. The carbon was backwashed with city water until clear, taking approximately ½ hour. Fallsington, Pennsylvania city water was then passed down flow at 2 gpm gal./cu.ft./min.) through the carbon. The oxygen levels were checked on both the inlet and outlet flow, being about 6 ppm on both samples, using a 0-10 ppm dissolved oxygen test kit.

Using a 0-10 gpd chemical feed pump, carbohydrazide as a 10 percent aqueous solution ("Eliminox" by Nalco) was added at a rate of 5 gpd. After approximately ½ hour the dissolved oxygen content in the effluent stream was less than 10 ppb as measured by a 0-100 ppb dissolved oxygen test kit. The chemical feed rate was then reduced to approximately 0.3 gpd. Over the next five hours the dissolved oxygen level slowly rose to approximately 60 ppb. At that time the chemical feed was turned off and the water allowed to flow over the carbon bed overnight (approximately seventeen hours). The next morning the influent and effluent water was again oxygen saturated as determined by the 0-10 ppm test kit (about 6 ppm).

The carbohydrazide feed pump was again turned on and set at a delivery rate of approximately 1 gpd. Over the next two hours the dissolved oxygen in the effluent decreased to approximately 80 ppb, and continued to decrease so that after six hours from the beginning of the run the oxygen was at approximately 10 ppb.

The above experiment was repeated. Carbohydrazide with a water feed of 2 gal/cu.ft./min., and a pump setting of 2 gpd (at 60° F.). After 1¼ hours the oxygen level was approximately 60 ppb, and was further reduced to 20-30 ppb and kept at that level for four hours.

The water flow was then reduced to ½ gal/cu.ft./min., and the carbohydrazide feed pump set at ½ gpd. Under these conditions the dissolved oxygen in the effluent was maintained at 10-20 ppb over the next eighteen hours.

Example 4

To show that the reaction of the above Examples proceeds only in the presence of the carbon, an experiment was carried out as follows. An empty 3.6 cu. ft. exchange tank was placed in line on the test stand, and no carbon was present in the process path. The water flow was set at 2 gpm and the carbohydrazide feed pump at 1 gpd—conditions which were shown earlier to reduce the amount of dissolved oxygen to approximately 10 ppb. After two hours under these conditions the dissolved oxygen in the effluent stream was the same as in the influent stream.

Example 5

This test was carried out in the same equipment as in Example 3 except that diethylhydroxylamine (DEHA) was used as the reducing agent. The test was started at a water flow of 1 gal/cu.ft. of catalyst/min. with a DEHA feed of 212 ppm per initial ppm oxygen in the water. After approximately one hour the oxygen on the outlet side had less than 0.01 ppm (<10 ppb) oxygen concentration. After three hours under these conditions the dissolved oxygen was still less than 0.01 ppm. The DEHA was then reduced to a feed rate of 22 ppm per ppm of dissolved oxygen present, and the experiment allowed to continue overnight. After nineteen hours under these conditions the dissolved oxygen on the outlet was still less than 0.1 ppm (<10 ppb).

The above experiment was continued, increasing the water flow to 2 gal/cu.ft./min. with no change in the DEHA feed rate, to provide approximately 11 ppm DEHA per initial ppm dissolved oxygen. After approximately 45 minutes the dissolved oxygen had increased to about 1 ppm. The experimental conditions were then changed back to 1 gal/cu.ft./min at the same flow of DEHA. The dissolved oxygen level decreased over the next one and one-half hours to less than 10 ppb, maintaining that level for the next several hours.

Although an illustrative embodiment of the invention has been described, it is to be understood that various modifications and substitutions may be made by those skilled in the art without departing from the novel spirit and scope of the present invention.

What is claimed is:

1. A method for deoxygenating a liquid that is at substantially ambient temperature and contains dissolved oxygen, which comprises the steps of:
    injecting into a stream of said liquid a reducing agent selected from the group consisting of carbohydrazide; diethylhydroxylamine; hydroxylamine; semicarbazide and salts of the above; and
    passing the liquid containing said reducing agent over a packed solid-phase catalyst bed to cause the reducing agent to interact with the catalyst at said ambient temperature to reduce the oxygen in the liquid, said catalyst being selected from the group consisting of activated carbon and synthetic-carbonaceous absorbents.

2. A method as defined in claim 1, in which said reducing agent is carbohydrazide.

3. A method as defined in claim 1, in which said reducing agent is diethylhydroxylamine.

4. A method as defined in claim 1, in which said catalyst is activated carbon.

5. A method as defined in claim 1, in which said liquid is water.

6. A method for deoxygenating water that is at substantially ambient temperature and contains dissolved oxygen, which comprises the steps of:
    injecting into a stream of said water a reducing agent selected from the group consisting of carbohydrazide and diethylhydroxylamine; and
    passing the water containing said reducing agent over an activated carbon bed to cause the reducing agent to interact with the activated carbon at said ambient temperature, reducing the oxygen in the water.

7. The method of claim 6 in which said reducing agent is carbohydrazide.

8. The method of claim 6 in which said reducing agent is diethylhydroxylamine.

* * * * *